(12) United States Patent
Powers, III

(10) Patent No.: US 7,823,361 B2
(45) Date of Patent: Nov. 2, 2010

(54) CONDUIT HOLDER FOR USE WITH A METAL STUD

(76) Inventor: John Powers, III, 4118 Elwood St., Phoenix, AZ (US) 85040

( * ) Notice: Subject to any disclaimer, the term of this patent is extended or adjusted under 35 U.S.C. 154(b) by 0 days.

(21) Appl. No.: 12/401,054

(22) Filed: Mar. 10, 2009

(65) Prior Publication Data

US 2010/0230550 A1 Sep. 16, 2010

(51) Int. Cl.
*E04H 12/00* (2006.01)
(52) U.S. Cl. .......................................... 52/691; 248/49
(58) Field of Classification Search .................. 248/49, 248/65, 74.1, 74.2, 72, 73; 174/135; 52/691
See application file for complete search history.

(56) References Cited

U.S. PATENT DOCUMENTS

| | | | | |
|---|---|---|---|---|
| 5,072,903 A | * | 12/1991 | Griffin | 248/72 |
| 5,236,158 A | * | 8/1993 | Condon | 248/73 |
| 6,800,812 B1 | * | 10/2004 | Franks, Jr. | 174/136 |
| 7,497,404 B1 | * | 3/2009 | Fullan et al. | 248/49 |
| 2006/0035525 A1 | * | 2/2006 | Moffatt | 439/638 |

* cited by examiner

*Primary Examiner*—Ramon O Ramirez
(74) *Attorney, Agent, or Firm*—Parsons & Goltry; Robert A. Parsons; Michael W. Goltry

(57) ABSTRACT

A conduit holder is constructed to be mounted to an elongated metal beam with upper and lower surfaces and rod-like coupling elements extending therebetween. The conduit holder includes a conduit path defining element with an opening defining an axis. The opening is designed to receive conduit therethrough parallel to the axis. An attachment element is fixed to the conduit path defining element and includes an elongated channel extending transverse to the axis of the conduit defining element. The channel has an external opening directed generally toward the conduit defining element and is constructed to engage a coupling element of the metal beam in the elongated channel and hold the conduit path defining element with the opening directed generally transverse to the metal beam.

15 Claims, 3 Drawing Sheets

CONDUIT HOLDER FOR USE WITH A METAL STUD

FIELD OF THE INVENTION

This invention generally relates to path defining, conduit constraining apparatus for use with metal studs in the building industry.

BACKGROUND OF THE INVENTION

Studs, joists, beams, rafters, etc. are terms used to describe various framing and support components in the building industry. For purposes of simplification and better understanding, the term "stud" or "studs" will be used generically in this disclosure to represent the metal framing or support component with which the present invention is used. Metal studs of the type anticipated herein are described in a copending U.S. patent application entitled "Metal Stud", bearing Ser. No. 12/275,914, filed on Nov. 21, 2008, and included herein by reference.

In the building industry today wooden studs are used almost exclusively. Wooden studs are a weak point in the industry, since wood is not only expensive but has a tendency to deteriorate over time. At present electrical cables, water and gas pipes, etc. (herein referred to generically as "conduits") are either attached to the wood by clamps that are nailed or screwed in place or are simply allowed to lie loosely on top of or alongside the studs. Affixing conduits with clamps by nailing or screwing requires substantial extra labor and can, if not carefully performed, result in damaged wires, etc. Allowing the conduits to lie loose is unsatisfactory since movement due to changing weather conditions, etc. can cause wear and, potentially, ultimate failure resulting in inconvenience if not greater hazards.

It would be highly advantageous, therefore, to remedy the foregoing and other deficiencies inherent in the prior art.

Accordingly, it is an object of the present invention to provide a new and improved conduit holder for use with metal studs.

It is another object of the present invention to provide a new and improved conduit holder that is constructed to form consistent and reliable conduit constraint and path defining apparatus.

It is another object of the present invention to provide a new and improved conduit holder that is easy to manufacture and relatively inexpensive and simple to use in the building industry.

SUMMARY OF THE INVENTION

Briefly, to achieve the desired objects of the instant invention in accordance with a preferred embodiment thereof, provided is a conduit holder constructed to be mounted to an elongated metal beam with upper and lower surfaces and rod-like coupling elements extending therebetween. The conduit holder includes a conduit path defining element with an opening defining an axis. The opening is designed to receive conduit therethrough parallel to the axis. An attachment element is fixed to the conduit path defining element and includes an elongated channel extending transverse to the axis of the conduit defining element. The channel has an external opening directed generally toward the conduit defining element and is constructed to engage a coupling element of the metal beam in the elongated channel and hold the conduit path defining element with the opening directed generally transverse to the metal beam.

The desired objects of the instant invention are further achieved in accordance with another embodiment thereof, in which a conduit holder is constructed to be mounted to an elongated metal beam with upper and lower surfaces and rod-like coupling elements extending therebetween. The conduit holder includes a conduit path defining element with an opening designed to receive conduit therethrough substantially parallel to the axis. A web element is fixed to the conduit path defining element and extends generally radially outwardly from the conduit path defining element. An attachment element includes an elongated channel in the form of a cylindrical portion and a neck portion extending from the cylindrical portion to the external opening. The attachment element is fixed to the web element along the length of the elongated channel with the external opening of the elongated channel directed generally toward the conduit defining element and the elongated channel extending substantially transverse to the axis of the conduit defining element. The attachment element is constructed to engage a coupling element of the metal beam in the cylindrical portion of the elongated channel and hold the conduit path defining element with the axis of the opening directed generally transverse to the metal beam.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
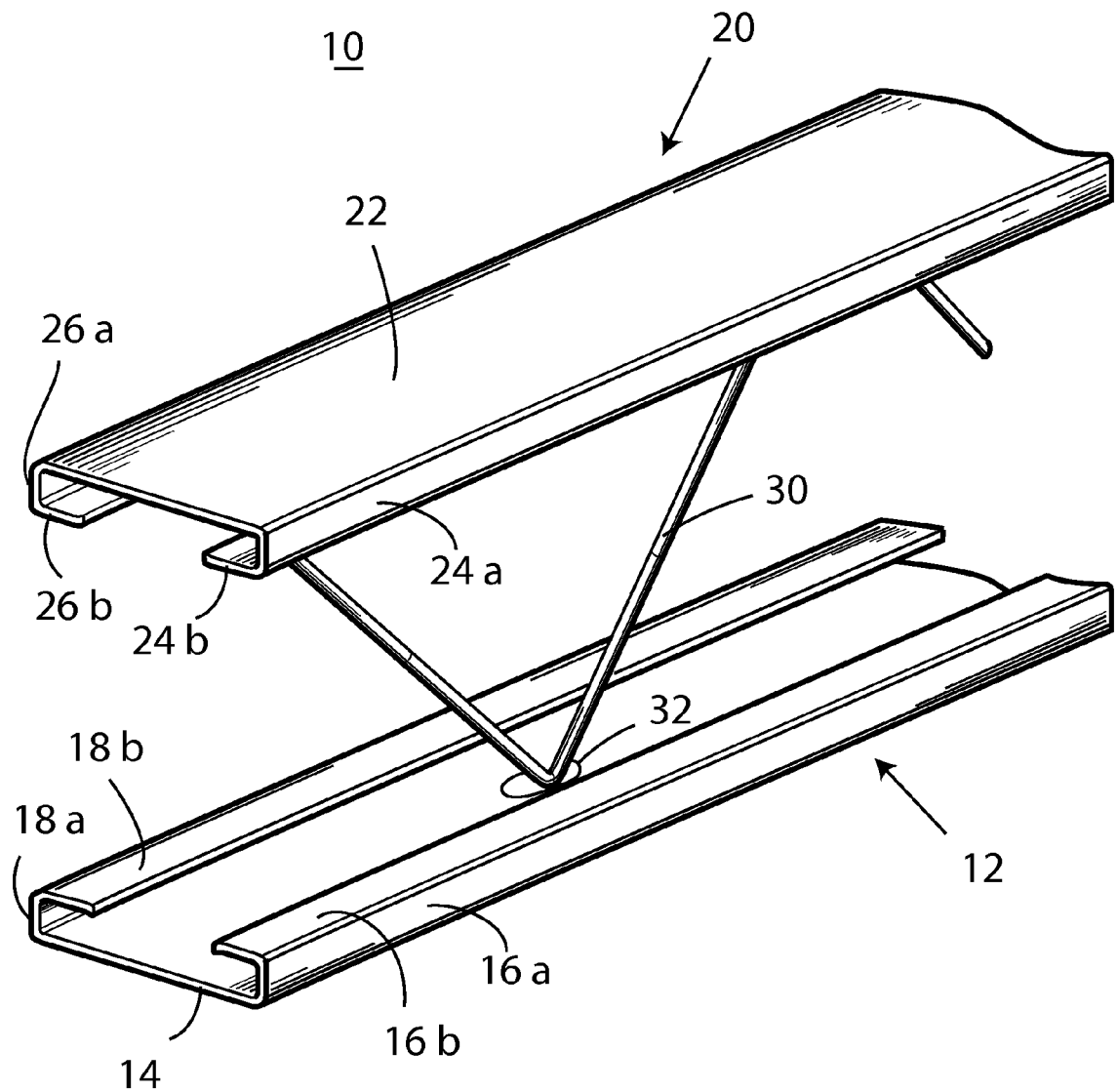
FIG. 1 is an enlarged view in perspective of a metal stud, portions thereof removed, anticipated as being used in conjunction with the present invention.

Turning now to FIG. 1 in which a metal stud 10 of the type described in the above identified copending patent application. Metal stud 10 includes a lower panel 12 forming a lower flat stud surface 14 with opposed edges turned upwardly at 16a, 18a, and inwardly at 16b, 18b, respectively, for the length of panel 12. Metal stud 10 also includes an upper panel 20 forming an upper flat stud surface 22 with opposed edges turned downwardly at 24a, 26a, and inwardly at 24b, 26b, respectively, for the length of panel 20. As will be recognized by those of ordinary skill in the art, the turned edges provide strength to metal stud 10. Also, while two ninety degree bends on each edge are included in conjunction with panels 12 and 20 for simplicity of understanding and manufacture, it will be understood that other bends might be incorporated in special circumstances or applications as described in more detail in the above identified copending application.

Generally, lower panel 12 and upper panel 20 are formed of any convenient metal material, such as a relatively heavy gauge sheet metal (e.g. 16 gauge to 25 gauge) with the specific metal selected for any specific application. For example in applications requiring substantial support the sheet metal selected might be sheet steel while in applications requiring less support but where weight might be a consideration sheet aluminum might be used. Also, throughout this disclosure the terms "lower" and "upper" refer to the components as they are illustrated and in no way are intended to limit the scope.

Lower panel 12 and upper panel 20 are positioned in parallel spaced apart relationship with lower stud surface 14 directed downwardly and upper stud surface 22 directed upwardly. An angular coupling element 30 extends between lower panel 12 and upper panel 20 and is bent periodically at some predetermined angle, generally between 30° and 90°, so as to alternately contact the inner surface of lower panel 12 and the inner surface of upper panel 20 at regular intervals (e.g. six inches). Generally, coupling element 30 is a single continuous length of some relatively heavy gauge wire or metal rod (e.g. 0.100" to 0.200" thick), herein generically referred to as "rod-like", that is bent to provide desired contact points 32 with the inner surfaces of lower panel 12 and upper panel 20. In this preferred embodiment coupling element 30 is affixed to the inner surfaces of lower panel 12 and upper panel 20 at contact points 32 by some convenient method such as spot welding or the like.

While a single coupling element 30 is illustrated it will be understood by those skilled in the art that two or more coupling elements could be used between panels either spaced apart transversely or in tandem with alternate angular points of one coupling element fixed to lower panel 12, alternate angular points of a second coupling element fixed to upper panel 20 and the open or unattached angular points of one coupling element affixed to the open or unattached angular points of the other coupling element. In this fashion the distance between lower panel 12 and upper panel 20 is twice the distance of a single coupling element. The open or unattached angular points of the coupling elements can be attached by spot welding or the like. Additionally, coupling element 30 can be offset toward the edges of lower panel 12 and upper panel 20 and attached to one of opposing edges 26a and 18a, or 16a and 24a. In this embodiment, inwardly directed potions 16b and 24b or 18b and 26b will be omitted. Again, this embodiment is disclosed in the above identified copending application.

Generally, metal stud 10 is used as a stud and the support provided is along the longitudinal axis or the length thereof. In this specific usage there is little cross or transverse pressure applied and coupling element 30 can be relatively light since it simply holds lower panel 12 and upper panel 20 in their relative positions. However, it will be recognized by those skilled in the art that in some instances metal stud 10 may be used as a joist or other horizontal element in construction. In these applications more pressure is applied transversely and some benefit may be realized in providing heavier coupling elements 30. For example, in some applications steel rod or the like might be utilized and additional support can be realized through a smaller angle of bend between contact points 32. Also, while a single continuous piece of material is preferred for coupling element 30 to simplify manufacturing, it will be understood that coupling element 30 could be formed in separate portions in specific applications.

Figure 2:
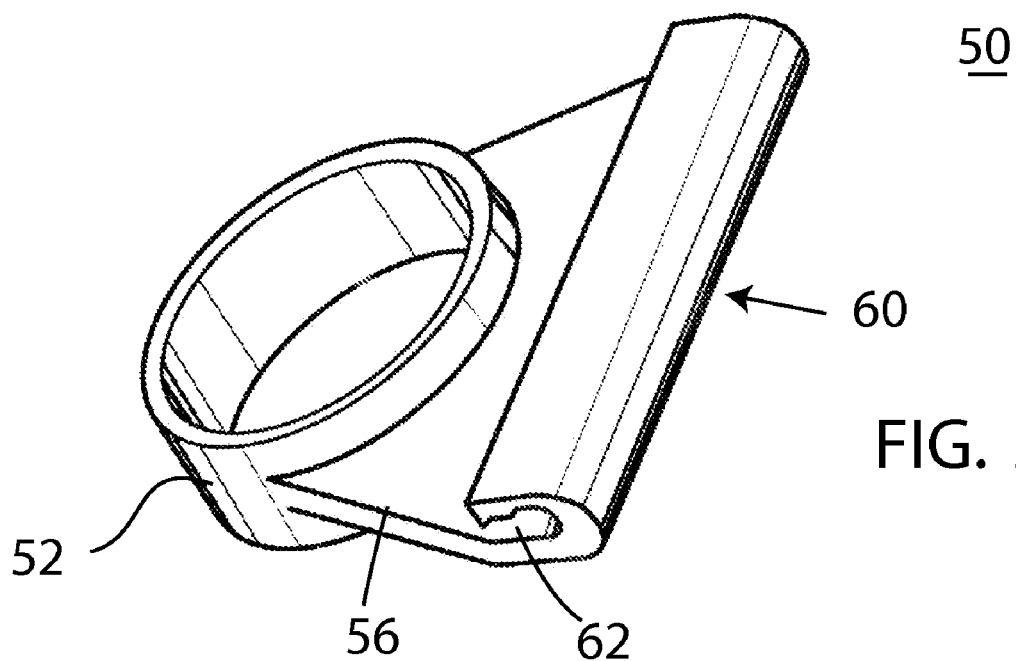
FIG. 2 is a view in perspective of an embodiment of a conduit holder for use with the metal stud of FIG. 1, in accordance with the present invention.
Figure 3:
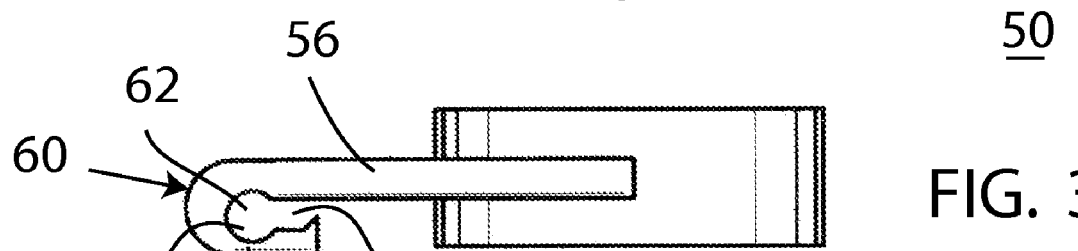
FIG. 3 is an end view of the conduit holder of FIG. 2.
Figure 4:
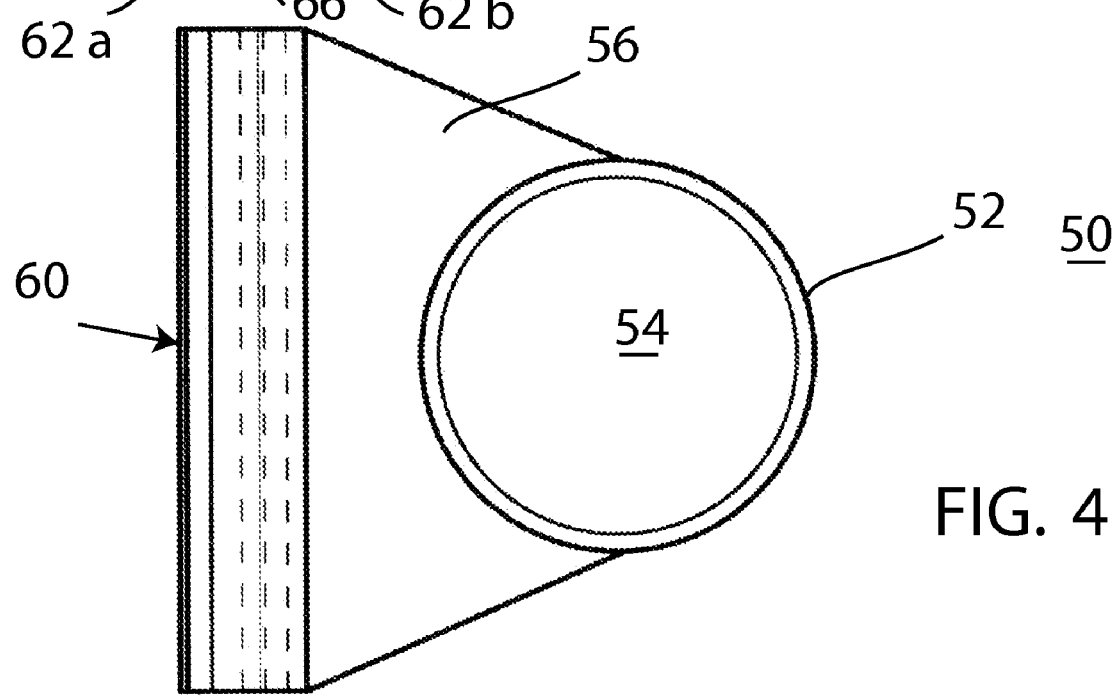
FIG. 4 is a side view of the conduit holder of FIG. 2 illustrating the relative position of hidden components in broken lines.

Turning to FIGS. 2, 3, and 4, a conduit holder 50, in accordance with the present invention, is illustrated. Conduit holder 50 includes a conduit path defining element 52, which in this embodiment is generally ring-shaped. It will be understood that element 52 can be formed in any desired cylindrical shape, i.e. any shape defining a conduit constraining opening designated 54 herein. However, it will be understood that element 52 preferably defines a circular opening 54, as illustrated, for ease in construction and use. Also, it will be understood that the cross-measurement (in this specific example the diameter) of constraining opening 54 can be any desired size, generally from one to several inches, to allow one or more conduits of various sizes to extend therethrough.

A fillet or web element 56 extends radially outwardly from the outer surface of element 52 to an elongated attachment element 60. In this specific embodiment, web element 56 radiates outwardly from element 52 and extends approximately 180° around the circumference to provide substantial support. It will be understood that a smaller web element could be used if desired. Also, web element 56 is formed as an integral part of element 52 for additional strength and simplicity of manufacture but it could be a discrete or separate element attached by welding or some type of bonding agent.

Attachment element 60 is constructed and designed to firmly attach conduit holder 50 to a coupling element 30 of metal stud 10. The outer most end of web element 56 terminates in a rearwardly opening or directed channel 62 designed to receive a coupling element 30 coaxially engaged therein. Referring specifically to FIG. 3, it can be seen that attachment element 60 includes an upper side 64 formed by an intermediate portion of web element 56 and a lower side 66 formed by the outermost edge of web element 56 with channel 62 defined therebetween. In its simplest construction, the outermost edge of web element 56 can be simply folded back upon itself to define channel 62 therein. Preferably channel 62 is formed with a slightly resilient material so that sides 64 and 66 spread sufficiently to receive a coupling element 30 coaxially therein and then close slightly to fix conduit holder 50 in place thereon.

In this preferred embodiment, channel 62 is formed with a cylindrical portion 62a (substantially circular cross-section) and a neck portion 62b extending from cylindrical portion 62a to an external opening. Neck portion 62b is reduced in cross-section as it extends toward the external opening. Thus, a coupling element 30 is positioned adjacent the external opening and is then forced into neck portion 62b, which is capable of expanding slightly to receive the coupling element 30 therein. By moving conduit holder 50 transverse to coupling element 30, conduit holder 50 is moved so that coupling element 30 is positioned in cylindrical portion 62a and will be held or locked in this position. Preferably, the cross-sectional area of cylindrical portion 62a is approximately the same or slightly smaller than the cross-section of a coupling element 30 so that a firm frictional engagement is achieved. While conduit holder 50 can be removed from engagement with coupling element 30 is desired, it is fixedly locked in the installed position during use and any conduits residing therein will provide a force that simply tends to hold conduit holder 50 in place.

Conduit holder 50 can be constructed of any convenient material, such as hard plastic, metal such as aluminum, etc. In a preferred embodiment conduit holder 50 is molded in a single integral piece for simplicity of manufacture and use. Further, as explained briefly above, the size of conduit path defining element 52 and attachment element 60 depend generally upon the specific application and can vary accordingly. For example, in conjunction with the specific metal stud described above (the angular coupling element 30 contacts the inner surface of lower panel 12 and the inner surface of upper panel 20 at six inch intervals) the illustration of conduit holder 50 in FIG. 4 could be substantially full size.

Figure 5:
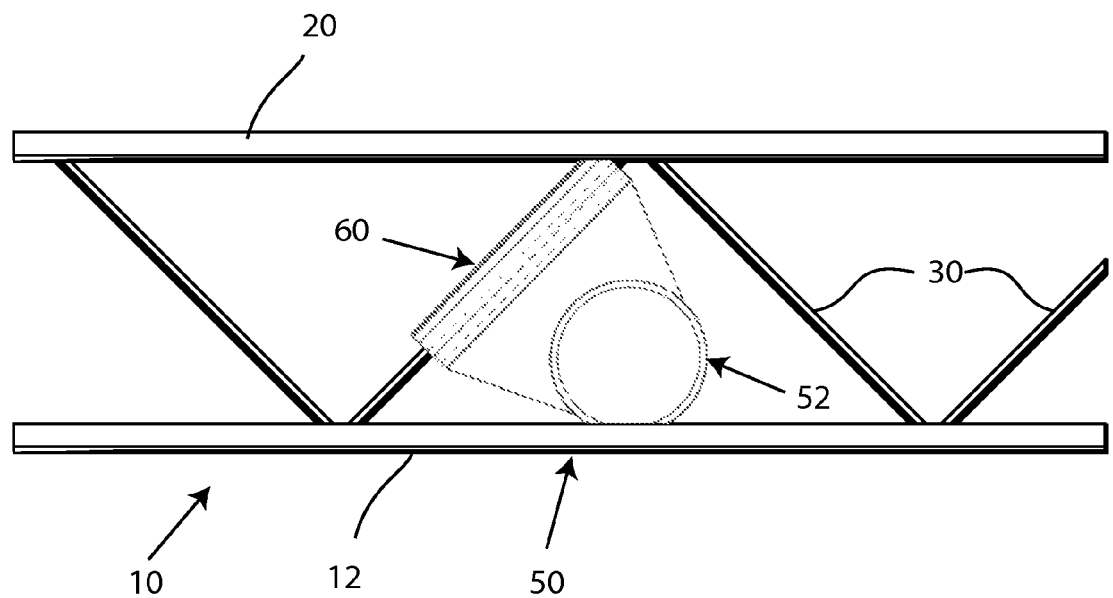
FIG. 5 is a side view of the conduit holder of FIG. 2 positioned on a metal stud of the type illustrated in FIG. 1.
Figure 6:
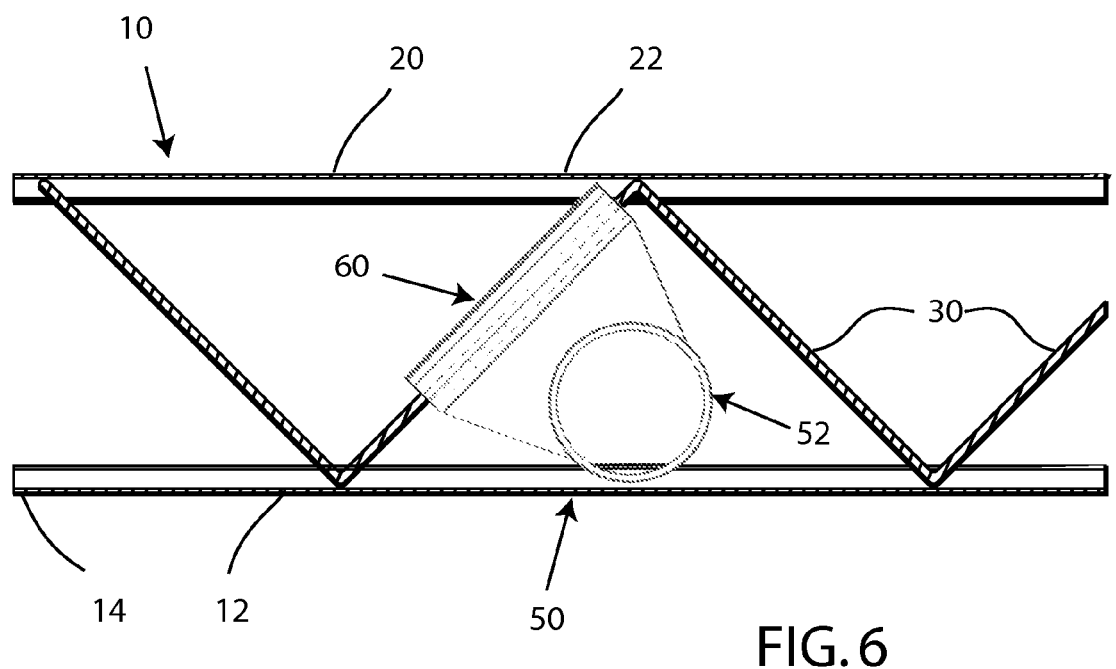
FIG. 6 is a side view of the conduit holder of FIG. 2 positioned on a metal stud as illustrated in FIG. 5 with the metal stud illustrated in a side sectional view to better illustrate the relative position of the conduit holder.

Turning to FIGS. 5 and 6, a conduit holder 50 is illustrated in a secured position on a coupling element 30 of metal stud 10. As can be seen in these illustrations, attachment element 60 extends coaxially a distance greater than one half the length of coupling element 30 and holds coupling element 30 fixedly in channel 62. Opening 54 of conduit path defining element 52 is positioned in one of the transverse openings between adjacent coupling element 30 and may, optionally rest on the inner surface of lower panel 12 (or upper panel 20) between the upturned edged. In a specific embodiment, the axial length of conduit path defining element 52 is slightly less than the distance between the upturned edges of lower panel 12 or upper panel 20 so as to limit rotational movement of conduit holder 50 about coupling element 30.

Thus, it will be understood that the new and improved conduit holder is relatively easy to manufacture since it can be preferably molded from some convenient material. Attaching a conduit holder to a coupling element can be easily accomplished with a minimum of effort and time. Also, the new and improved conduit holder simplifies the installation of conduits in any building. Therefore, a new and improved conduit holder is disclosed that is constructed to form consistent and reliable support for various conduits.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A conduit holder comprising:
    an elongated metal beam with a lower panel and an upper panel positioned in a parallel spaced apart relationship, and a rod-like coupling element extending therebetween and retaining the lower panel relative the upper panel;
    a conduit path defining element with an opening defining an axis, the opening being designed to receive conduit therethrough substantially parallel to the axis; and
    an attachment element fixed to the conduit path defining element and including an elongated channel extending substantially transverse to the axis of the conduit defining element, the channel having an external opening directed generally toward the conduit defining element, the attachment element receiving the coupling element of the metal beam in the elongated channel and holding the conduit path defining element with the opening directed generally transverse to the metal beam between the lower panel and the upper panel.

2. A conduit holder as claimed in claim 1 wherein the conduit path defining element is cylindrically shaped.

3. A conduit holder as claimed in claim 2 wherein the conduit path defining element is ring-shaped.

4. A conduit holder as claimed in claim 1 wherein the elongated channel of the attachment element includes a cylindrical portion and a neck portion extending from the cylindrical portion to the external opening.

5. A conduit holder as claimed in claim 4 wherein the neck portion of the elongated channel has a reduced cross-section from adjacent the cylindrical portion to adjacent the external opening.

6. A conduit holder as claimed in claim 4 wherein the cylindrical portion of the elongated channel has a substantially circular cross-section.

7. A conduit holder as claimed in claim 6 wherein the cylindrical portion of the elongated channel has a circular cross-section no larger than a cross-section of the coupling element.

8. A conduit holder as claimed in claim 1 wherein the attachment element is fixed to the conduit path defining element by a web element.

9. A conduit holder as claimed in claim 8 wherein the web element extends generally radially outwardly from the conduit path defining element at one side and along the length of the elongated channel on an opposite side.

10. A conduit holder as claimed in claim 9 wherein the conduit path defining element, the attachment element, and the web element are formed as an integral unit.

11. A conduit holder constructed to be mounted to an elongated metal beam with upper and lower surfaces and rod-like coupling elements extending therebetween, the conduit holder comprising:
    a conduit path defining element with an opening defining an axis, the opening being designed to receive conduit therethrough substantially parallel to the axis; and
    an attachment element fixed to the conduit path defining element and including an elongated channel extending substantially transverse to the axis of the conduit defining element, the elongated channel having an external opening directed generally toward the conduit defining element, the elongated channel including a cylindrical portion and a neck portion extending from the cylindrical portion to the external opening, the attachment element constructed to engage a coupling element of the metal beam in the elongated channel and hold the conduit path defining element with the axis of the opening directed generally transverse to the metal beam.

12. A conduit holder constructed to be mounted to an elongated metal beam with upper and lower surfaces and rod-like coupling elements extending therebetween, the conduit holder comprising:
    a conduit path defining element with an opening defining an axis, the opening being designed to receive conduit therethrough substantially parallel to the axis;
    a web element fixed to the conduit path defining element and extending generally radially outwardly from the conduit path defining element; and
    an attachment element including an elongated channel in the form of a cylindrical portion and a neck portion extending from the cylindrical portion to the external opening, the attachment element being fixed to the web element along the length of the elongated channel with the external opening of the elongated channel directed generally toward the conduit defining element and the elongated channel extending substantially transverse to the axis of the conduit defining element; and
    the attachment element constructed to engage a coupling element of the metal beam in the cylindrical portion of the elongated channel and hold the conduit path defining element with the axis of the opening directed generally transverse to the metal beam.

13. A conduit holder as claimed in claim 12 wherein the cylindrical portion of the elongated channel has a substantially circular cross-section.

14. A conduit holder as claimed in claim 13 wherein the cylindrical portion of the elongated channel has a circular cross-section no larger than a cross-section of the coupling element.

15. A conduit holder as claimed in claim 12 wherein the conduit path defining element, the attachment element, and the web element are formed as an integral unit.

* * * * *